C. W. POTTER & A. F. VAN DEINSE.
TEMPORARY INSULATOR.
APPLICATION FILED APR. 23, 1913.
1,101,210.  Patented June 23, 1914.
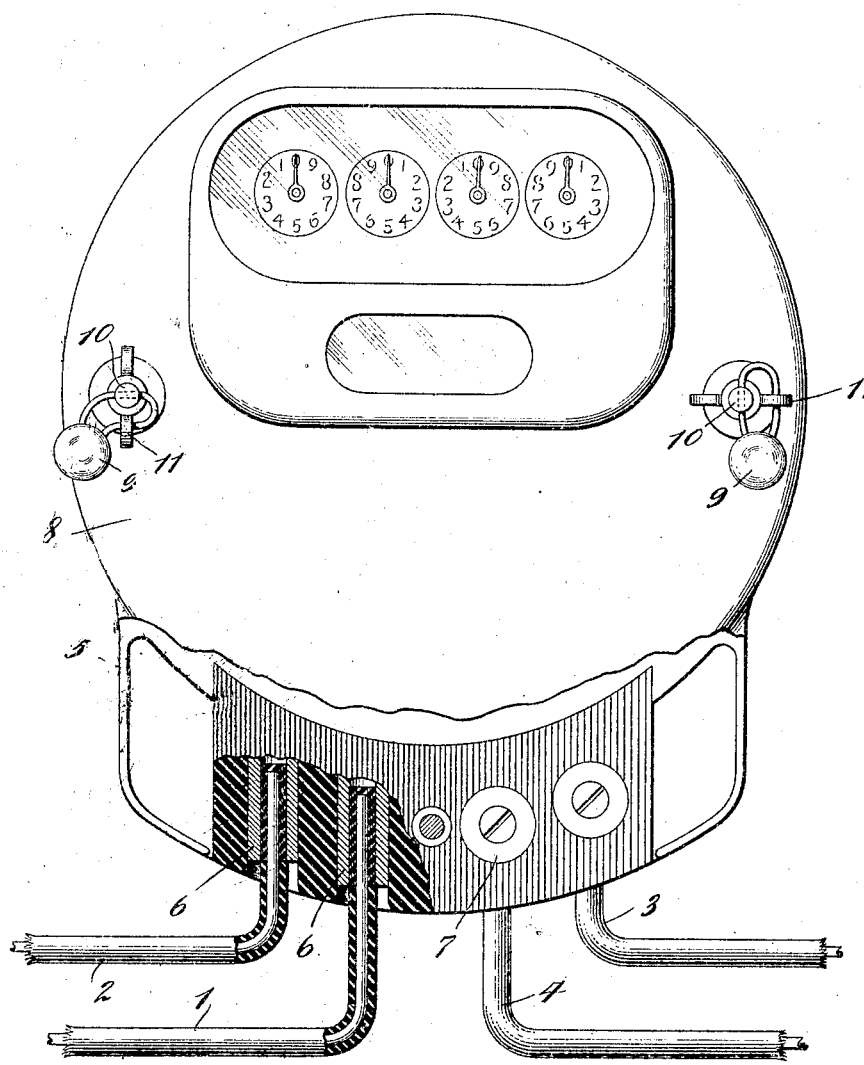

UNITED STATES PATENT OFFICE.

CHARLES W. POTTER AND ANTON F. van DEINSE, OF ALBUQUERQUE, NEW MEXICO.

TEMPORARY INSULATOR.

1,101,210.      Specification of Letters Patent.      Patented June 23, 1914.

Application filed April 23, 1913. Serial No. 762,992.

*To all whom it may concern:*

Be it known that we, CHARLES W. POTTER and ANTON F. VAN DEINSE, citizens of the United States, residing at Albuquerque, in the county of Bernalillo and State of New Mexico, have invented certain new and useful Improvements in Temporary Insulators, of which the following is a full, clear, and exact description.

Our invention relates to improvements in temporary insulators and more particularly to insulators adapted for use in temporarily disconnecting service wires and the like. It is the usual custom among electrical companies when it is desired to disconnect the measured service, to remove the meter and disconnect the service wires at the poles in order to prevent an occupant from using current without the knowledge of the electrical company. However, in apartment houses and office buildings, it is usually impracticable to cut off the meter loop as the apartments or office suites in the same building are usually fed from a single service main. Consequently, when the meter is removed, the loose terminals are merely taped with insulating material and it is necessary only to remove this taping and close the meter loop in order to obtain current without the knowledge of the electrical company.

The object of our invention, therefore, is to avoid these objections and it consists in providing a means for disconnecting the service, the arrangement, construction and operation of which will be hereinafter fully described and referred to in the appended claims.

In the accompanying drawings Figure 1 is an elevation of a meter with a portion of the cover broken away; and Figs. 2 and 3 shows forms of temporary insulators.

Referring to the drawings, 1 and 2 represent the feed wires, and 3 and 4 the wires leading to the load, the current passing through the meter 5. The terminals of the feed and load wires lead into the meter from below and are fastened in the terminal blocks 6 by the binding-screws 7. The cover 8 of the meter which extends over and conceals the binding-screws, is secured against unauthorized removal by the seals 9 which comprise a small wire passing through holes 10 in the bolt fastened to the meter, and holes 11 in the nuts which hold the cover in place, the ends of the wire being sealed with lead or the like. The use of this particular form of seal is not essential and any well known form of lock may be substituted.

The temporary insulators 12 are of paper covered with an insulating varnish rolled in the form of tubes and cut to the proper length. One end of the tube may be filled with an insulating material 13 to form a cap as shown in Fig. 2. It is evident that tubes or caps made of any insulating material such as rubber, asbestos, etc., may be used instead of the paper ones shown and described.

When it is desired to disconnect service, the cover is removed, and either the feed-wires or the load wires are removed from the terminal blocks by loosening the binding-screws 7. The caps or tubes of insulating material are then slipped over the bare ends of the conductors and the covered ends are re-inserted in the terminal blocks and fastened tightly in place by the binding-screws. The cover is placed on the meter and the nuts 11 tightened to hold the cover in place, and the seals are then affixed. It is to be noted that with this form of insulation the circuit will be positively disconnected inside of the meter and the wires are held tightly in place so that it is impossible to remove the insulating devices or withdraw the wires from the meter unless the seals are broken and the binding-screws 7 loosened. This connection avoids the necessity of removing the meter which, being a delicate instrument, is very liable to be damaged and often is, in removing it and replacing it, as is necessary when an occupant leaves or enters an apartment or office suite.

Our invention is not limited to this specific application, but may be used in modified forms for the purpose of positively opening any circuit temporarily as, for example, insulating washers may be placed under fuse plugs and sheets of material may be placed between the blades and jaws of a service switch. Containing boxes may be provided for such fuse-plugs, etc., as in the case of the meter, and these boxes may be locked or sealed in any desired way.

Having thus described our invention, we claim:—

1. In combination, an electric conductor, an electric device normally in circuit therewith, connecting means for the two, means for temporarily insulating said conductor and device from each other, said means comprising an insulating shield interposed between said conductor and device and held in place by said connecting means, a housing for the device and connecting means, said housing being provided with a cover, and a lock for said cover.

2. In combination, an electric instrument provided with terminal blocks having binding-screws, conductors normally connected to said terminal blocks by said binding-screws, and means for temporarily disconnecting said instrument from the conductor, said means comprising an insulating shield interposed between the terminal blocks and the conductor, said insulator being held in place by said binding-screw, a cover for said binding-screw, and means provided with a lock for holding said cover in closed position.

3. The combination of an electrical device and a locked housing therefor, a binding-post within the housing, an electric conductor leading into said housing and mechanically connected with said binding-post, and an independent removable insulating body interposed between the conductor and the conducting parts of the binding-post.

In witness whereof, we subscribe our signatures in the presence of two witnesses.

CHARLES W. POTTER.
ANTON F. van DEINSE.

Witnesses as to the signature of Charles W. Potter:
LEE SKIPWITH,
L. R. MEHL.

Witnesses as to the signature of Anton F. van Deinse:
H. B. RAY,
JULIA R. WILCOX.